(12) United States Patent
Kawahara et al.

(10) Patent No.: US 6,462,563 B1
(45) Date of Patent: Oct. 8, 2002

(54) FINGERPRINT READING DEVICE AND METHOD THEREOF

(75) Inventors: Yukito Kawahara; Hiroyuki Fujita; Tsutomu Matsuhira, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/638,261

(22) Filed: Aug. 11, 2000

(30) Foreign Application Priority Data

Aug. 12, 1999 (JP) .......................................... 11-228458

(51) Int. Cl.[7] .............................................. G01R 27/26
(52) U.S. Cl. ...................................... 324/690; 324/662
(58) Field of Search ................................ 324/662, 661, 324/671, 686, 687, 688, 690, 770

(56) References Cited

U.S. PATENT DOCUMENTS

| | | | | |
|---|---|---|---|---|
| 4,353,056 A | * | 10/1982 | Tsikos | 340/146.3 |
| 5,461,319 A | * | 10/1995 | Peters | 324/660 |
| 5,583,303 A | * | 12/1996 | Franz | 73/862.046 |
| 6,072,318 A | * | 6/2000 | Jordil | 324/660 |
| 6,114,862 A | * | 9/2000 | Tartagni et al. | 324/662 |

OTHER PUBLICATIONS

Direct contact 500dppi fingerprint sensor, IEEE, Jan. 1998.*
A single chip fingerprint sensor and identifier, IEEE, Dec. 1999.*

* cited by examiner

Primary Examiner—N. Le
Assistant Examiner—Vincent Q. Nguyen
(74) Attorney, Agent, or Firm—Adams & Wilks

(57) ABSTRACT

A fingerprint reading system is provided with enhanced versatility and reduced cost. The fingerprint reading sensor includes a group of first electrodes arranged in a plurality of lines extending in a first direction, a group of second electrodes arranged in a plurality of lines extending in a second direction intersecting the first direction above the first electrode group through an interlayer insulating film, and a surface protective film formed of a dielectric material provided on the second electrode group. Drive circuits detect electrostatic capacity between each of the electrodes and a finger touching the surface protective film by sequentially applying a predetermined voltage to both groups of electrodes and measuring a change in the electrostatic capacity at each point where a second electrode crosses over a first electrode.

11 Claims, 3 Drawing Sheets

FINGERPRINT READING DEVICE AND METHOD THEREOF

BACKGROUND OF THE INVENTION

1. Field of the Invention

The present invention relates to a fingerprint reading device and to a method of use thereof.

2. Related Background Art

Some known systems for authenticating an individual for the purpose of keeping confidentiality, etc., use an ID number, a password, and so on. However, an ID is not perfect to maintain confidentiality because the ID number and password might leak out. While on the other hand, a system using a fingerprint reading device is proposed as being capable of keeping confidentiality at a much higher level.

There have been proposed electrostatic capacity type fingerprint reading devices (Japanese Patent Application Laid-Open No. Hei4-231803, etc.) for detecting a fingerprint pattern by utilizing the fact that electrostatic capacities between a group of electrodes arranged in a two-dimensional array and a finger touching [on] the electrode group through a dielectric substance layer differ corresponding to a ruggedness of the fingerprint. Some of this type of fingerprint reading devices has been utilized.

However, because the electrostatic capacity type fingerprint reading sensor in the prior art has a necessity for providing detection electrodes and active elements in a two-dimensional array, it is complicated in manufacturing and high in Cost. Further, conventionally there was not a well-designed scheme for what sort of apparatus incorporate such type of fingerprint reading device and how the fingerprint reading device is used, and very few fingerprint reading devices have been utilized.

SUMMARY OF THE INVENTION

It is a primary object of the present invention, which was devised under such circumstances, to provide a finger print reading device and a method thereof that are capable of enhancing a versatility when actually used, increasing productivity and reducing costs.

To accomplish the above object, according to a first aspect of the present invention, a fingerprint reading device comprises a fingerprint reading sensor including a group of first electrodes arranged in a plurality of lines extending in a first direction, a group of second electrodes arranged in a plurality of lines extending in a second direction intersecting the first direction above the first electrode group through an inter-layer insulating film, and a surface protective film composed of a dielectric substance provided on the second electrode group, and a drive circuit for measuring an electrostatic capacity between each of the electrodes and a fingerprint touching on the surface protective film by sequentially applying a predetermined voltage to any one group of the first electrodes and the second electrodes and at the same time sequentially applying the voltage to the other group of the electrodes, and measuring a change in the electrostatic capacity in the vicinity of a point of intersection between the first electrode and the second electrode.

According to the first aspect of the invention, the predetermined voltage is applied to every first electrode, and the pattern of the electrostatic capacities at the points of intersections are detected by scanning the second electrodes, thereby obtaining an image of the fingerprint.

According to a second aspect of the present invention, in the fingerprint reading device according to the first aspect of the invention, the drive circuit may detect, as a first electrostatic capacity value, the electrostatic capacity between each of the electrodes and the fingerprint touching on the surface protective film in a state where the voltage is applied to each electrode of the first electrode group and of the second electrode group, and further detect, as a second electrostatic capacity value, the electrostatic capacity between each of the electrodes and the fingerprint touching on the surface protective film in a state where the voltage is applied simultaneously to two electrodes passing through each point of intersection between the first electrode and the second electrode, then obtain an electrostatic capacity variation value at each point of intersection by comparing the first electrostatic capacity value with the second electrostatic capacity value, and obtain a fingerprint pattern from a pattern of the electrostatic capacity variation values.

According to the second aspect of the invention, the first electrostatic capacity value between the fingerprint and the electrode when applying the voltage solely to each of the first and second electrodes, is compared with the second electrostatic capacity value when applying the voltage simultaneously to the first and second electrodes passing through each point of intersection, thereby obtaining the electrostatic capacity variation values between the respective points of intersections and the fingerprint. A fingerprint pattern is obtained from the pattern of the electrostatic capacity variation values.

According to a third aspect of the present invention, in the fingerprint reading device according to the first or the second aspect of the invention, the fingerprint reading sensor may be transparent and provided in at least a part of the display area of the liquid crystal panel of the liquid crystal display device.

According to the third aspect of the invention, the fingerprint reading sensor is provided in superposition on the display area of the liquid crystal panel, and can be therefore mounted together with the liquid crystal panel when incorporating into an electronic apparatus, etc. This makes it feasible to save space for installing the fingerprint reading sensor.

According to a fourth aspect of the present invention, in the fingerprint reading device according to the third aspect of the invention, the fingerprint reading sensor may be provided on a surface of the polarizing plate or the transparent substrate of the liquid crystal panel.

According to the fourth aspect of the invention, the fingerprint sensor is provided on the transparent substrate or the polarizing plate and can thus be made integral with the liquid crystal panel.

According to a fifth aspect of the present invention, a fingerprint reading method comprises the steps of arranging a group of first electrodes in a plurality of lines extending in a first direction, arranging a group of second electrodes in a plurality of lines extending in a second direction intersecting the first direction above the first electrode group through an inter-layer insulating film, applying sequentially a predetermined voltage to any one group of the first electrodes and the second electrodes and at the same time sequentially applying the voltage to the other group of the electrodes by use of a fingerprint reading sensor of which a surface is provided with a surface protective film composed of a dielectric substance, and measuring a change in electrostatic capacity at a point of intersection between the first electrode and the second electrode.

According to the fifth aspect of the invention, the predetermined voltage is applied to every first electrode, and the pattern of the electrostatic capacities at the points of intersections are detected by scanning the first electrodes, thereby obtaining an image of the fingerprint.

According to a sixth aspect of the present invention, a fingerprint reading method comprises the steps of detecting, as a first electrostatic capacity value, the electrostatic capacity between each of the electrodes and the fingerprint touching on the surface protective film in a state where the voltage is applied to each electrode of the first electrode group and of the second electrode group, detecting, as a second electrostatic capacity value, the electrostatic capacity between each of the electrodes and the fingerprint touching on the surface protective film in a state where the voltage is applied simultaneously to two electrodes passing through each point of intersection between the first electrode and the second electrode, obtaining an electrostatic capacity variation value at each point of intersection by comparing the first electrostatic capacity value with the second electrostatic capacity value, and obtaining a fingerprint pattern from a pattern of the electrostatic capacity variation values.

According to the sixth aspect of the invention, the first electrostatic capacity value between the fingerprint and the electrode when applying the voltage solely to each of the first and second electrodes, is compared with the second electrostatic capacity value when applying the voltage simultaneously to the first and second electrodes passing through each point of intersection, thereby obtaining the electrostatic capacity variation values between the respective points of intersections and the fingerprint. A fingerprint pattern is obtained from the pattern of the electrostatic capacity variation values.

DESCRIPTION OF THE PREFERRED EMBODIMENT

An embodiment of the present invention will hereinafter be described.

Figure 1A:
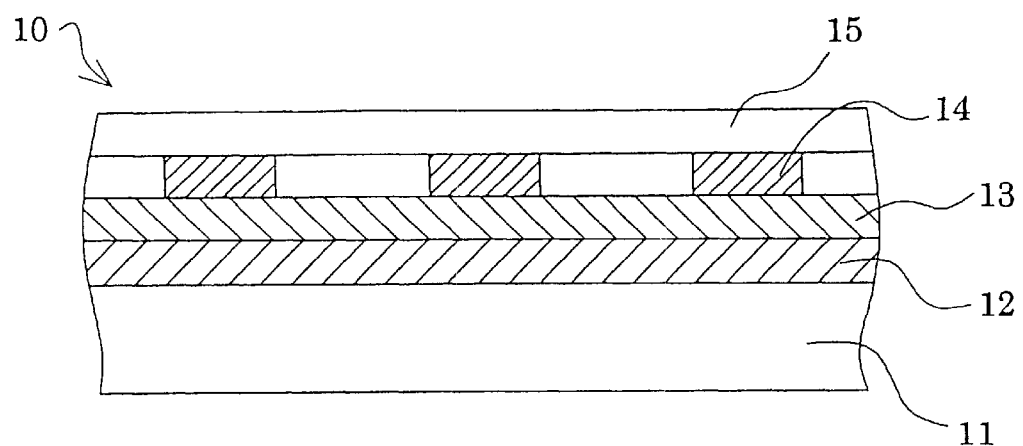
FIGS. 1(a) is a sectional view schematically showing a configuration of a fingerprint reading device in one embodiment of the present invention.

FIG. 1 schematically shows a configuration of a fingerprint reading device in one embodiment.

As illustrated in FIG. 1, a finger print reading device 10 has such a geometry that X-axis electrodes 12 are disposed at a predetermined spacing on a substrate 11, Y-axis electrodes 14 orthogonal to the X-axis electrodes 12 are disposed at an equal spacing through an inter-layer insulating film 13 on the X-axis electrodes 12. Further, a surface protective film 15 composed of a dielectric substance is provided on the Y-axis electrodes 14. Moreover, each of the X-axis electrodes 12 is connected to an X-axis driver 18, and each of the Y-axis electrodes 14 is connected to a Y-axis driver 19.

Note that a standard resolution of the fingerprint reading device 10 is on the order of 300 dpi at a pitch of approximately 50 μm.

Figure 2A:
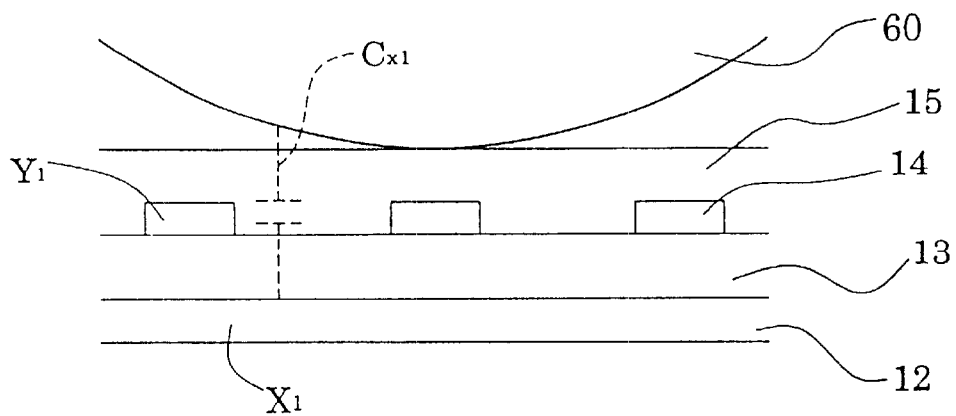
FIGS. 2(a) through 2(c) are explanatory views showing how a fingerprint is read by the fingerprint reading device in one embodiment of the present invention.
Figure 2B:
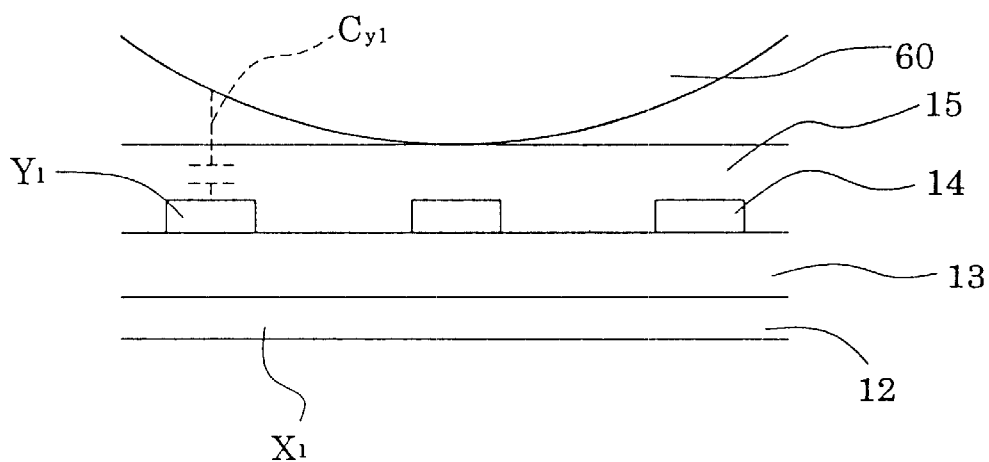
Figure 2C:
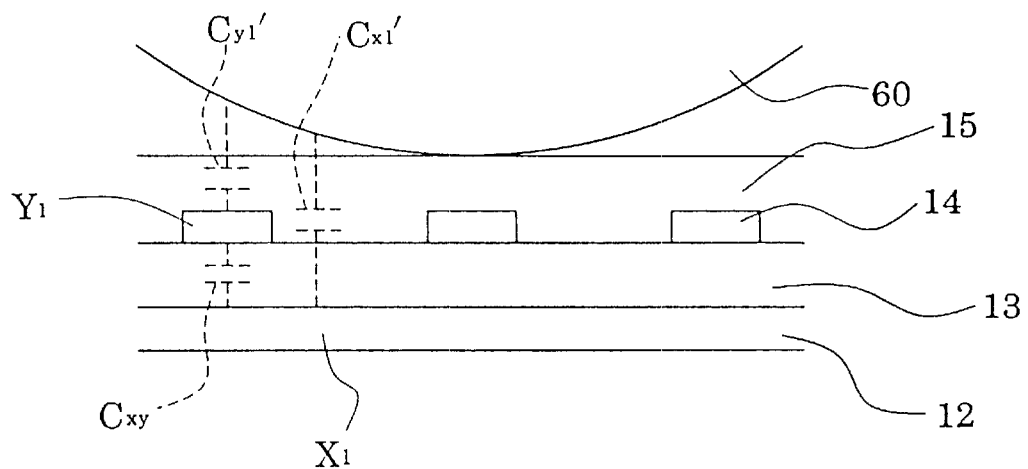

Steps of detecting the fingerprint by use of the thus constructed fingerprint reading device 10 will be briefly explained. FIGS. 2(a), 2(b) and 2(c) are schematic explanatory diagrams showing how the fingerprint is detected.

Figure 1B:
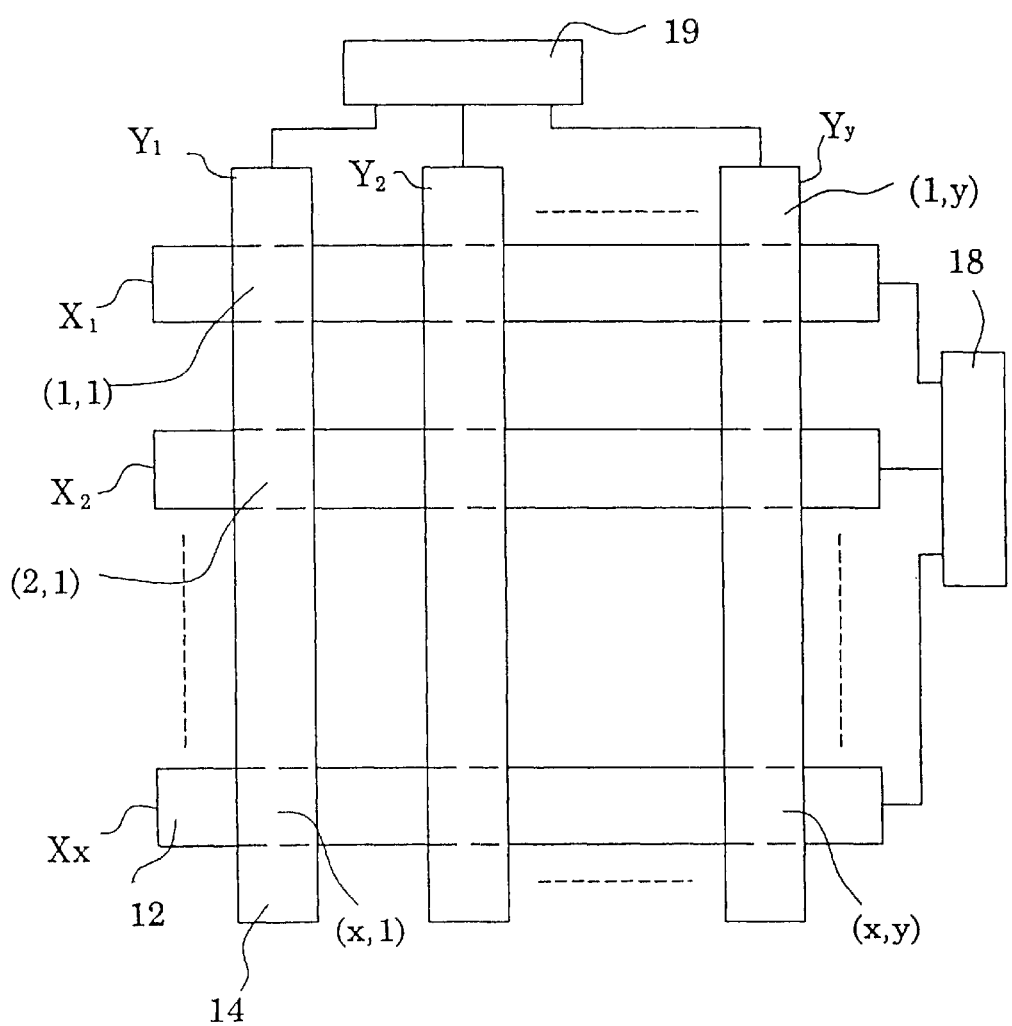
FIG. 1(b) is a plan view thereof.

As shown in FIG. 1(b), supposing that x-pieces of X-axis electrodes 12X1~12Xx and y-pieces of Y-axis electrodes 14Y1~14Yy are provided, addresses (1, 1)~(x, y) are given to respective points of intersections thereof.

Herein, to begin with, when the X-axis driver 18 selects the X-axis electrode X1 and applies a predetermined voltage thereto, a capacitor Cx1 is formed between a finger 60 and the X-axis electrode X1 (FIG. 2(a)). An electrostatic capacity of this capacitor Cx1 is a total value of the X-axis electrodes X1 extending in the longitudinal direction. Further, when the Y-axis driver 19 selects the Y-axis electrode Y1 and applies a predetermined voltage thereto, a capacitor Cy1 is formed between the finger 60 and the Y-axis electrode Y1 (FIG. 2(b)). An electrostatic capacity of this capacitor Cy1 is a total value of the Y-axis electrodes Y1 extending in the longitudinal direction. These numerical values are measured with respect to the X-axis electrodes 12 and the Y-axis electrodes 14 and set as a first electrostatic capacity value.

On the other hand, the X-axis electrodes X1~Xx are sequentially chosen for the duration of applying the predetermined voltage to the Y-axis electrode Y1, and for instance, a predetermined voltage is applied in sequence thereto. A value obtained by this operation is set as a second electrostatic capacity value.

At this time, if, e.g., the X-axis electrode X1 is selected, a mutual interference occurs between the X-axis electrode X1 and the Y-axis electrode Y1 in the vicinity of a point-of-intersection (1, 1), and, for example, there occurs a change such as forming a capacitor Cxy between the X-axis electrode X1 and the Y-axis electrode Y1. With this change, an electrostatic capacity value between the point-of-intersection (1, 1) and the finger 60 changes. Due to this change in the electrostatic capacity value, the first electrostatic capacity value and the second electrostatic capacity value, which have been measured with respect to the X-axis electrode X1 and the Y-axis electrode Y1, differ from each other. Namely, as explained above, the capacitors Cx1 and Cy1 that are separately measured become capacitors Cx1' and Cy1' of which electrostatic capacities are different from each other.

Herein, an electrostatic capacity variation value obtained by comparing the first electrostatic capacity value with the second electrostatic capacity value, depends on an electrostatic capacity between the finger (60) and the point-of-intersection (1, 1) between the X-axis electrode X1 and the Y-axis electrode Y1, and is therefore different based on whether apart facing to the point-of-intersection (1, 1) is a projected area or a recessed area of the fingerprint. Accordingly, if a magnitude of this variation value is obtained per point of intersection and a pattern of these variation values is formed, a fingerprint-mapped pattern is obtained, whereby the fingerprint can be read.

A thus constructed fingerprint reading sensor 10 is provided in, e.g., a liquid crystal display area on a liquid crystal panel of a liquid crystal display device, and can be easily assembled to an electronic apparatus, etc. Note that the X-axis electrodes 12, the inter-layer insulating film 13, the Y-axis electrodes 14 and the surface protective film 15 in this case must be all, as a matter of course, composed of transparent materials.

FIG. 3 shows an example in which the fingerprint reading device is provided on the liquid crystal panel.

As illustrated in FIG. 3, a liquid crystal panel 20 is constructed in a way of joining a first transparent substrate 21 to a second transparent substrate 22 through a spacer 23, and interposing a liquid crystal layer 24 therebetween. Further, transparent electrodes 25 and active elements 26 are arranged on the inner side of the first transparent substrate 21 in a two-dimensional array corresponding to pixels in a face-to-face relation with the liquid crystal layer 24, and an orientated film 27 is provided covering these electrodes 25 and elements 26. On the other hand, on the inner side of the second transparent substrate 22, a common transparent electrode 28 and an oriented film 29 covering the surface thereof are provided above the liquid crystal layer 24. Note that polarizing plates 31, 32 are provided on the outer side of the first and second transparent substrates 21, 22.

Figure 3A:
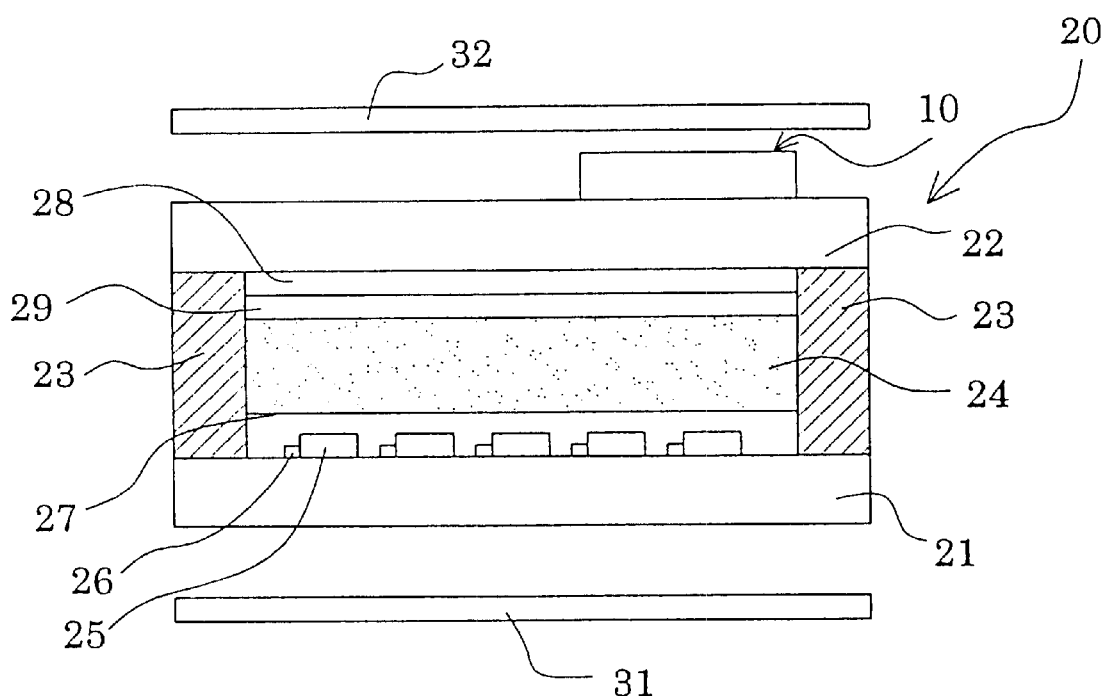
FIGS. 3(a) and 3(b) are sectional views each showing a liquid crystal display device mounted with the fingerprint reading device in one embodiment of the present invention.
Figure 3B:
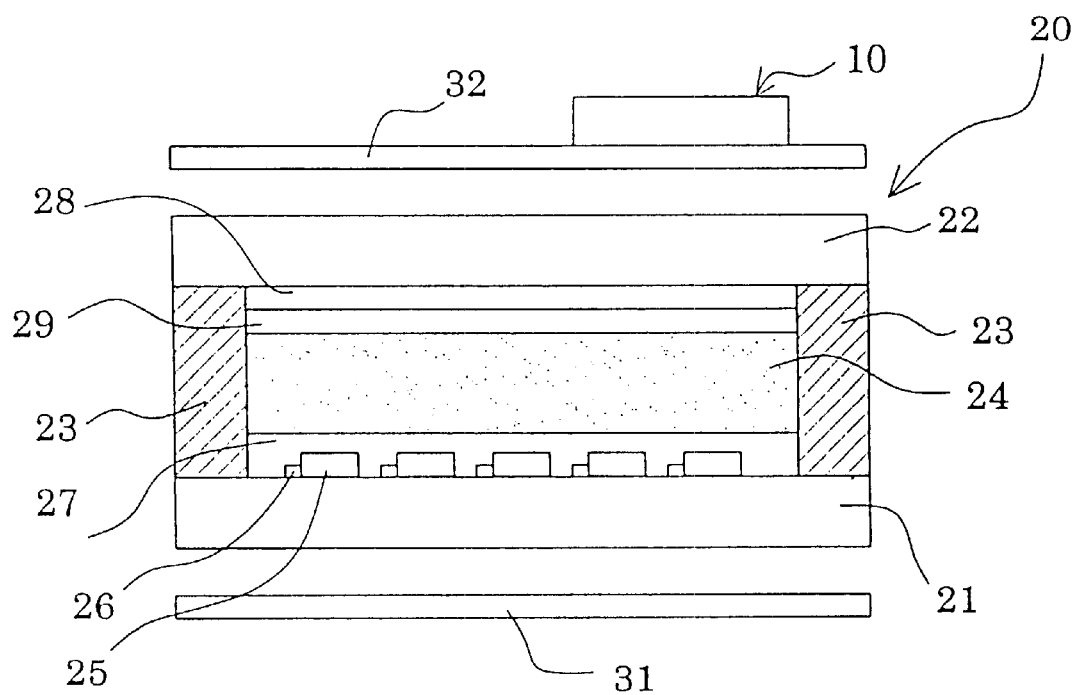

Herein, FIG. 3(a) shows an example where the fingerprint reading device 10 is provided on the outer side of the second transparent substrate 22. FIG. 3(b) shows an example where the fingerprint reading device 10 is provided on the polarizing plate 32. The finger print reading device 10 maybe disposed, without being limited to a specific position in the plane-direction of the liquid crystal display area, at a corner or central portion of the display area, and further the whole display area may also be utilized as the fingerprint reading device.

The fingerprint reading device may easily be incorporated into a variety of electronic apparatuses each having the liquid crystal display device, such as various personal computers, mobile terminals, mobile telephones, personal handyphone systems (PHS) and display-attached cards.

As discussed above, according to the present invention, the electrostatic capacity type fingerprint reading sensor and the drive circuit thereof are provided on the liquid crystal panel, thereby exhibiting effects of being capable of enhancing the versatility when actually used, increasing the productivity and reducing the costs.

What is claimed is:

1. A fingerprint reading device comprising: a fingerprint reading sensor having a first group of electrodes arranged in a plurality of lines extending in a first direction, a second group of electrodes arranged in a plurality of lines extending in a second direction intersecting the first direction, an insulation film provided between the first group of electrodes and the second group of electrodes, and a surface protective film formed of a dielectric substance provided over the first and second groups of electrodes, each point at which one electrode of the second group of electrodes crosses over one electrode of the first group of electrodes being a respective cell of the fingerprint reading sensor; and a drive circuit for measuring an electrostatic capacity between each of the electrodes and a finger touching the surface protective film by sequentially applying a predetermined voltage to one of the first group of electrodes and the second group of electrodes and at the same time sequentially applying the predetermined voltage to the other group of electrodes, and measuring a change in electrostatic capacity at the respective cells.

2. A fingerprint reading device according to claim 1; wherein the drive circuit measures a change in the electrostatic capacity at the respective cells by detecting a first electrostatic capacity value between each of the electrodes and the finger touching the surface protective film while the voltage is individually applied to each electrode of the first electrode group and the second electrode group, detecting a second electrostatic capacity value between each of the electrodes and the finger touching the surface protective film while the voltage is applied simultaneously to two electrodes passing through each point at which a second electrode crosses over a first electrode, and obtaining an electrostatic capacity variation value at each cell by comparing the first electrostatic capacity value with the second electrostatic capacity value, and obtains a fingerprint pattern based on a pattern of the electrostatic capacity variation values at each cell.

3. A fingerprint reading device according to either claim 1 or claim 2; wherein the fingerprint reading sensor is transparent and is provided in a display area of a liquid crystal display panel.

4. A fingerprint reading device according to claim 3; wherein the fingerprint reading sensor is provided on a surface of a polarizing plate or a transparent substrate of the liquid crystal display panel.

5. A fingerprint reading device according to claim 1; wherein the first and second groups of electrodes are transparent electrodes formed on a transparent substrate of a liquid crystal panel.

6. A fingerprint reading device according to claim 1; wherein the first and second groups of electrodes of the fingerprint reading sensor are transparent.

7. A fingerprint reading device according to claim 1; wherein the fingerprint reading sensor is provided in a display area of a liquid crystal display panel.

8. A fingerprint reading method comprising the steps of:
arranging a group of first electrodes in a plurality of lines extending in a first direction;
arranging a group of second electrodes in a plurality of lines extending in a second direction intersecting the first direction and above the first electrode group through an inter-layer insulating film;
arranging a surface protective film formed of a dielectric substance on the group of second electrodes;
sequentially applying a predetermined voltage to one of the first group of electrodes and the second group of electrodes and at the same time sequentially applying the predetermined voltage to the other group of electrodes; and
measuring a change in electrostatic capacity at a point where a second electrode crosses over a first electrode.

9. A fingerprint reading method comprising the steps of:
arranging a group of first electrodes in a plurality of lines extending in a first direction;
providing an interlayer insulating film on the first group of electrodes;
arranging a group of second electrodes in a plurality of lines extending in a second direction intersecting the first direction and above the interlayer insulating film to form a fingerprint reading sensor having an array of cells each comprising a point where a second electrode crosses over a first electrode;
providing an interlayer insulating film between the group of first electrodes and the group of second electrodes;
providing a surface protective film formed of a dielectric substance on the group of second electrodes;
detecting a first electrostatic capacity value between each of the electrodes and a finger touching the surface protective film while a voltage is individually applied to each electrode of the first electrode group and the second electrode group;
detecting a second electrostatic capacity value between each of the electrodes and the finger touching the surface protective film while a voltage is simultaneously applied to two electrodes passing through the respective cells;
obtaining an electrostatic capacity variation value at each cell by comparing the first electrostatic capacity value with the second electrostatic capacity value; and obtaining a fingerprint pattern from a pattern of the electrostatic capacity variation values at each cell.

10. A fingerprint reading device comprising: a fingerprint reading sensor having a first group of electrodes arranged in a plurality of lines extending in a first direction, a second group of electrodes arranged in a plurality of lines extending in a second direction intersecting the first direction, an insulation film provided between the first group of electrodes and the second group of electrodes, and a surface protective film formed of a dielectric substance provided over the first and second groups of electrodes, each point at which one electrode of the second group of electrodes crosses over one electrode of the first group of electrodes being a respective cell of the fingerprint reading sensor; and a drive circuit for driving the fingerprint reading sensor to obtain a fingerprint pattern by measuring a change in the electrostatic capacity at the respective cells by detecting a first electrostatic capacity value between each of the electrodes and a finger touching the surface protective film while a predetermined voltage is individually applied to each electrode of the first electrode group and the second electrode group, detecting a second electrostatic capacity value between each of the electrodes and the finger touching the surface protective film while the predetermined voltage is applied simultaneously to two electrodes passing through each point at which a second electrode crosses over a first electrode, obtaining an electrostatic capacity variation value at each cell by comparing the first electrostatic capacity value with the second electrostatic capacity value, and obtaining the fingerprint pattern based on a pattern of the electrostatic capacity variation values at the respective cells.

11. A fingerprint reading device according to claim 10; wherein the fingerprint reading sensor is transparent and is provided in a display area of a liquid crystal display panel.

* * * * *